(12) United States Patent
White, II

(10) Patent No.: US 11,641,548 B2
(45) Date of Patent: May 2, 2023

(54) MANAGING PROCESSOR INTENSIVE COMMANDS BY A CONTROLLER

(71) Applicant: Biamp Systems, LLC, Beaverton, OR (US)

(72) Inventor: Harold C M White, II, Tigard, OR (US)

(73) Assignee: Biamp Systems, LLC, Beaverton, OR (US)

( * ) Notice: Subject to any disclaimer, the term of this patent is extended or adjusted under 35 U.S.C. 154(b) by 40 days.

(21) Appl. No.: 17/173,197

(22) Filed: Feb. 10, 2021

(65) Prior Publication Data

US 2022/0256289 A1   Aug. 11, 2022

(51) Int. Cl.
   *H04R 5/04* (2006.01)
   *G06F 3/16* (2006.01)
   *H04R 3/12* (2006.01)

(52) U.S. Cl.
   CPC .............. *H04R 5/04* (2013.01); *G06F 3/165* (2013.01); *G06F 3/167* (2013.01); *H04R 3/12* (2013.01)

(58) Field of Classification Search
   CPC .. H04R 5/04; H04R 3/12; G06F 3/165; G06F 3/167
   See application file for complete search history.

(56) References Cited

U.S. PATENT DOCUMENTS

| | | | | |
|---|---|---|---|---|
| 2012/0245718 A1* | 9/2012 | Condit | .................... | G06F 3/165 715/727 |
| 2016/0077789 A1* | 3/2016 | Hampiholi | .............. | H04L 67/01 709/203 |
| 2018/0181366 A1* | 6/2018 | Bowling | ................. | G06F 3/165 |
| 2021/0014294 A1* | 1/2021 | Wilssens | ................. | H04L 65/61 |

\* cited by examiner

*Primary Examiner* — Fan S Tsang
*Assistant Examiner* — David Siegel

(57) ABSTRACT

One example method of operation may include determining whether a received command will be locally processed by a control device, determining an audio stream is associated with the received command, forwarding the audio stream to a server, and forwarding an audio output to a termination device based on a processed audio stream.

20 Claims, 6 Drawing Sheets

MANAGING PROCESSOR INTENSIVE COMMANDS BY A CONTROLLER

BACKGROUND

Conventionally, wall mounted control units were generally a single switch or panel of switches which may offer on and off options, granular controls, such as light and audio levels, etc., Overall, those control systems remain fairly plain and do not process information or offer commands that require logic or multiple operations. In the more recent years, controllers have various features to support a microcontroller, memory, etc., as small computing devices which store commands in memory and execute logic that may have multiple operations included in the result.

Applications that process digital data and perform filtering or other digital signal processing types of operations may have a need for greater processing capacity, larger memory, faster results, etc. Controllers may not have a way to identify which commands can be processed locally and which cannot be managed locally in a near real time scenario. Having different controllers for different tasks or a large computer at the front of every controller may not be necessary as certain commands can be outsource and sent from the processing entities directly to the endpoints.

SUMMARY

Example embodiments of the present application provide at least a method that includes one or more of determining whether a received command will be locally processed by a control device, determining an audio stream is associated with the received command, forwarding the audio stream to a server, and forwarding an audio output to a termination device based on a processed audio stream.

Another example embodiment may include an apparatus that includes a processor configured to determine whether a received command will be locally processed by a control device, determine an audio stream is associated with the received command, forward the audio stream to a server, and forward an audio output to a termination device based on a processed audio stream.

Another example embodiment may include a non-transitory computer readable storage medium configured to store instructions that when executed cause the processor to perform determining whether a received command will be locally processed by a control device, determining an audio stream is associated with the received command, forwarding the audio stream to a server, and forwarding an audio output to a termination device based on a processed audio stream.

DETAILED DESCRIPTION

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in one or more embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide for methods, processes, devices, systems and non-transitory computer readable mediums which execute instructions to provide controller capabilities which are not limited to mere processing of control commands but which also includes a decision to forward processor intensive commands to server which is integrated into the audio and media network system.

Figure 1:
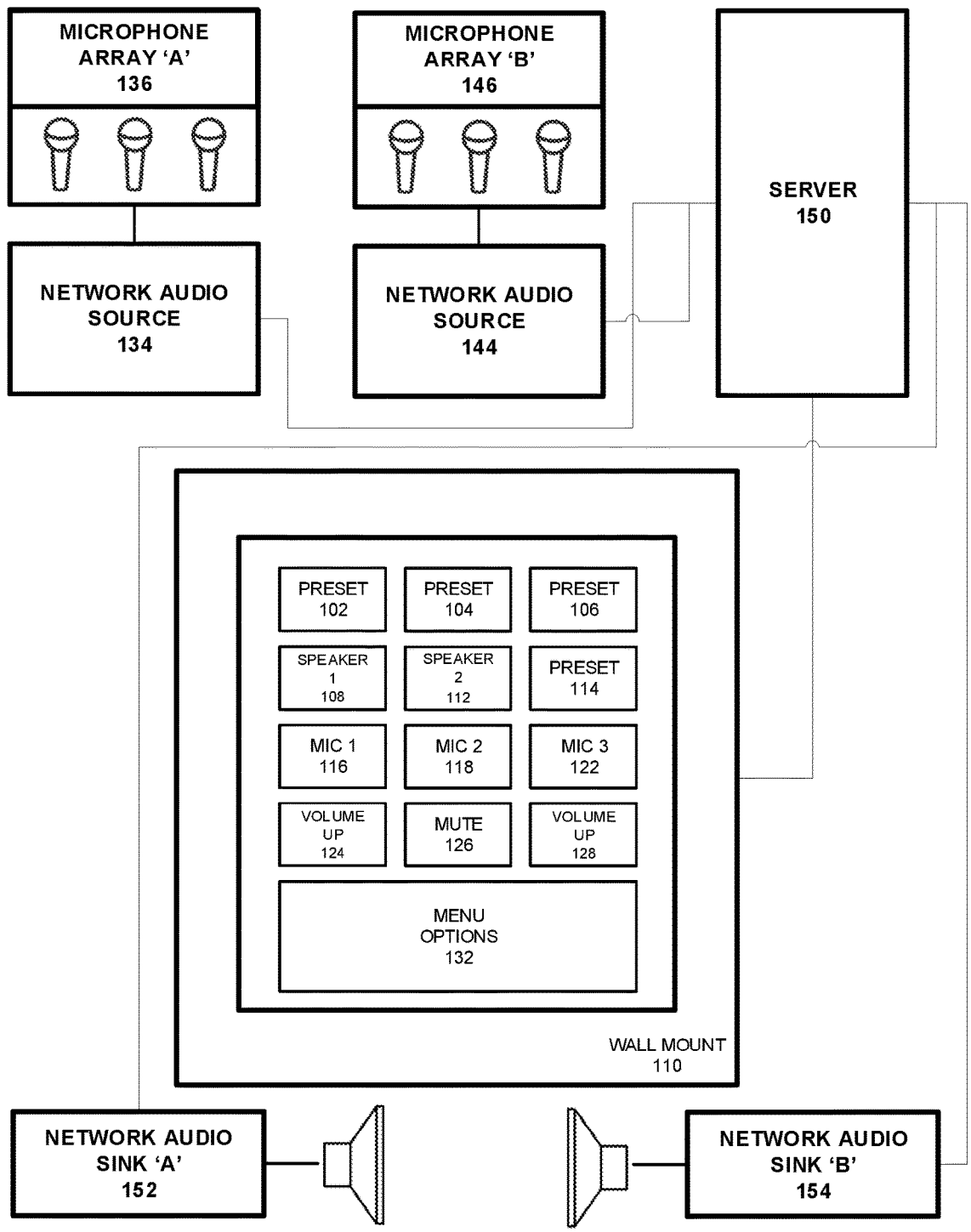
FIG. 1 illustrates an example audio network configuration with a central controller, processing server and other network elements according to example embodiments.

FIG. 1 illustrates an example audio network configuration with a central controller, processing server and other network elements according to example embodiments. Referring to FIG. 1, the configuration 100 includes a wall mounted control panel 110 that is in communication with various termination devices, such as network audio source 134 as a network device in communication with a microphone array 136, network audio source 144 as a network device in communication with a microphone array 146, a server 150 which maintains the processing components for advanced data processing, and other output devices, such as speakers 152 and 154.

In operation, when a command is inputted via the user interface of the controller in any one of the preset command buttons 102-128, the command may be examined by a control unit process of the wall mount device to determine whether the command can be processed locally by device 110 itself or whether intensive processing is required via a remote processor to perform the command operation. Examples of commands which are processed by the controller 110 may be changes in audio volume, accessing certain endpoints, such as speakers and microphones, relaying unmodified data, etc. Once the command is identified as requiring additional processing, the server 150 may be sent a notification to prepare for a data receiving operation. The notification may include an audio and/or digital feed that was captured by a memory associated with the peripheral devices 134/144 or a memory associated with the wall mount controller 110. The decision to pursue a DSP filtering operation on the audio or some other data may be performed by a preset function 102/104/106 that is programmed into a memory of the controller 110. The server 150 may store the information associated with the controller interface profile.

When a processing operation is performed, the data may be filtered, processed, etc., at the server 150 and forwarded directly to the intended endpoint device 152/154, etc. The designation of the endpoint device may be selected by input at the controller 110 and sent as part of the notification to the server 150 that processing is needed for a selected audio modification operation. That way, the server 150 has an intended endpoint to direct the processed content to when the processing is completed and the controller may be sent an update notification that the processed data was delivered.

Figure 2:
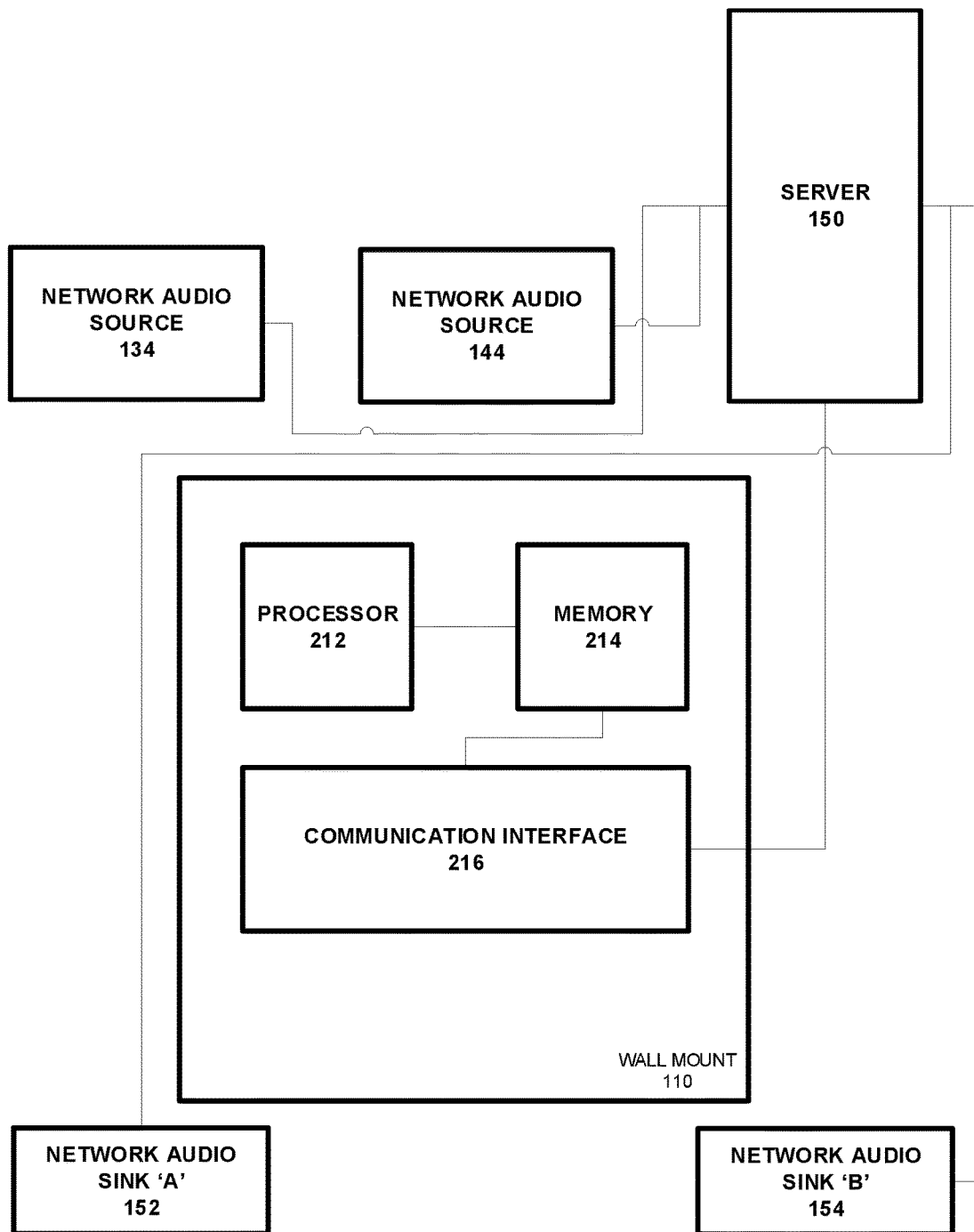
FIG. 2 illustrates a detailed example of a central controller and other network elements according to example embodiments.

FIG. 2 illustrates a detailed example of a central controller and other network elements according to example embodiments. Referring to FIG. 2, the example 200 illustrates the internal hardware of the controller 110, which may include a display interface, a power source, a communication interface, such as a network data card or other communication component, a memory 214 and a processor 212. When any of the inputted selections require the data to be processed in a processor intensive manner, the controller identifies the selection as a trigger to forward the command and associated data to the server 150. The result will be the server 150 forwarding the final output data to the endpoint device.

Figure 3:
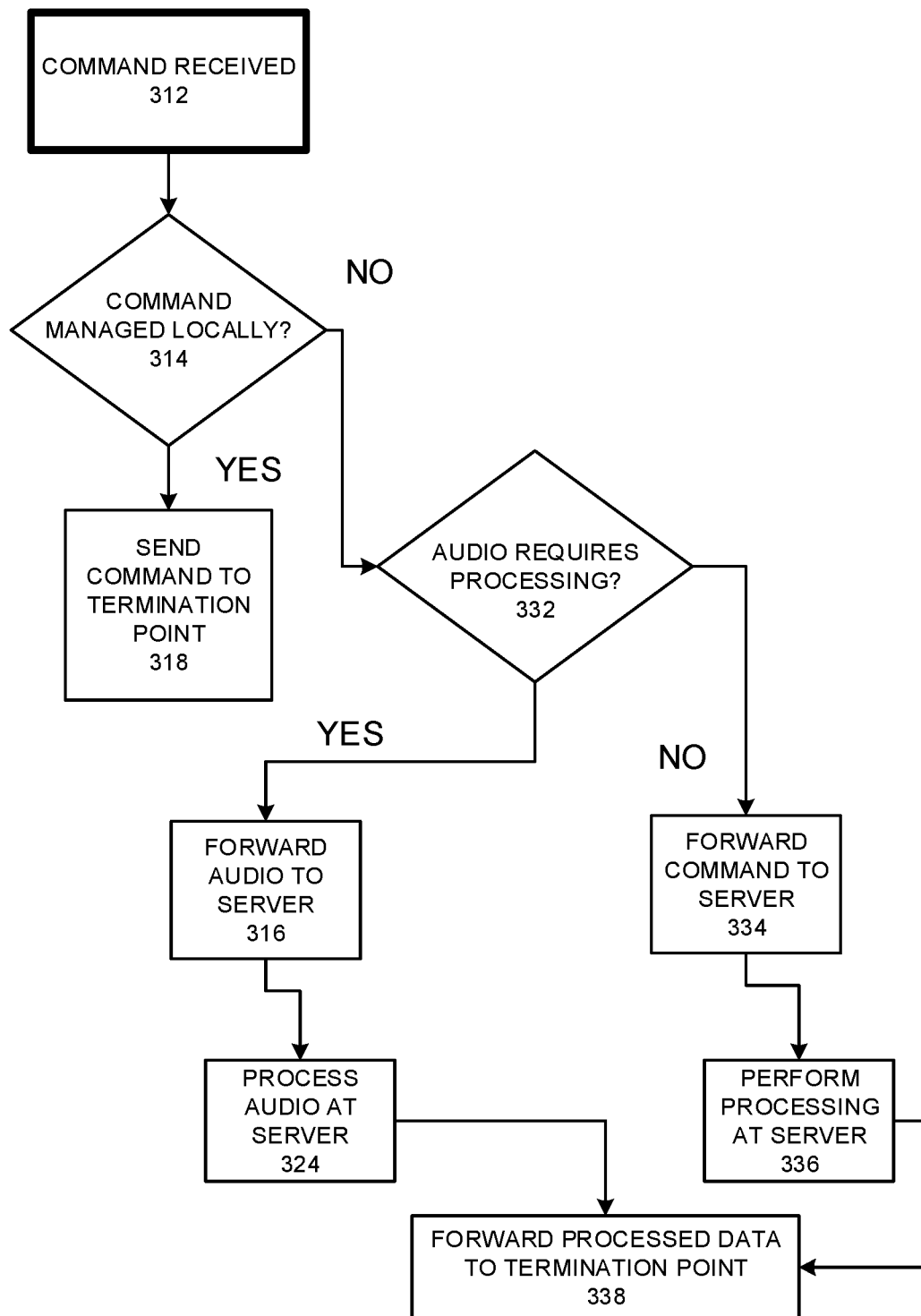
FIG. 3 illustrates a logic flow diagram of a decision process for control management according to example embodiments.

FIG. 3 illustrates a logic flow diagram of a decision process for control management according to example embodiments. Referring to FIG. 3, the logic diagram 300 includes a command received 312 and a determination 314 by the controller logic as to whether the command is to be performed locally or to be sent to server 150. If local processing is sufficient, the command is sent to the termination point directly 318, and if not, the command is identified as being tied to audio data or not 332. If not, the command is forwarded without accompanying audio data 334 and processing at the server 336, if so, the audio data is forwarded 316 and processed at the server 324. All processed data is forwarded to the termination point 338 identified by the controller 110 when the notification is sent.

Figure 4:
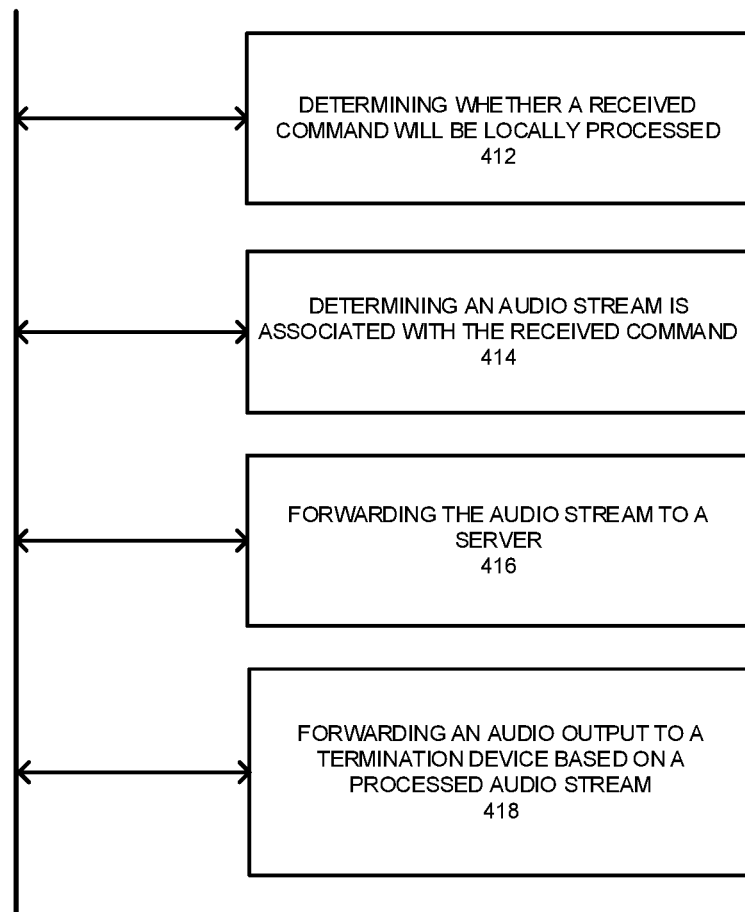
FIG. 4 illustrates a logic flow diagram of an example process for managing received commands according to example embodiments.

FIG. 4 illustrates a logic flow diagram of an example process for managing received commands according to example embodiments. Referring to FIG. 4, the process 400 may include determining whether a received command will be locally processed by a control device 412, determining an audio stream is associated with the received command 414, forwarding the audio stream to a server 416, and forwarding an audio output to a termination device based on a processed audio stream.

The process may also include receiving a notification that the audio stream was processed by the server and forwarded to a termination device. The process may also include filtering the audio stream by the server and transmitting the filtered audio stream to a loudspeaker identified by control device. The process may also include forwarding a control device configuration to the server, and storing the control device configuration in memory. The process may also include determining an additional command received will be processed by the control device based on the command type. The command type of the additional command is one or more of a modification to the volume, an on or off status, and a termination device selection. The command type of the command is a digital filtering procedure to perform to the audio stream to remove data, add data, etc., prior to outputting the audio to a loudspeaker.

Figure 5:
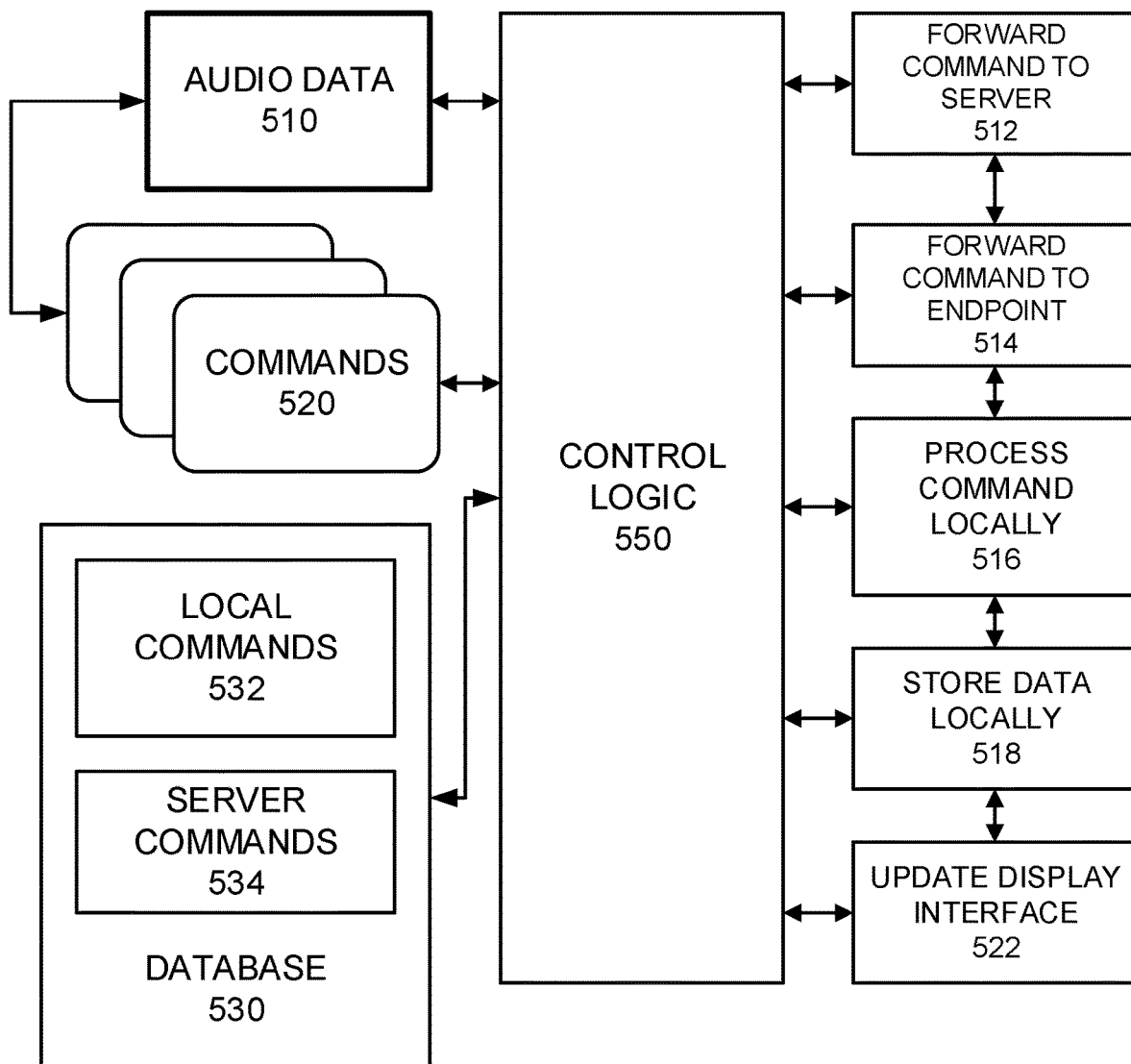
FIG. 5 illustrates a logic processing module identifying input and output produced by a system processor according to example embodiments.

FIG. 5 illustrates a logic processing module identifying input and output produced by a system processor according to example embodiments. Referring to FIG. 5, the logic module 550 may include a set of audio data received 510, commands 520 from the controller, and certain local commands and server commands 532/534 are stored in memory 530 and are identified to determine whether to forward the command to the server 512, to an endpoint 514, to process the command locally 516, store data locally 518 and to whether to update the interface 522.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent any of the above-described network components of the other figures.

Figure 6:
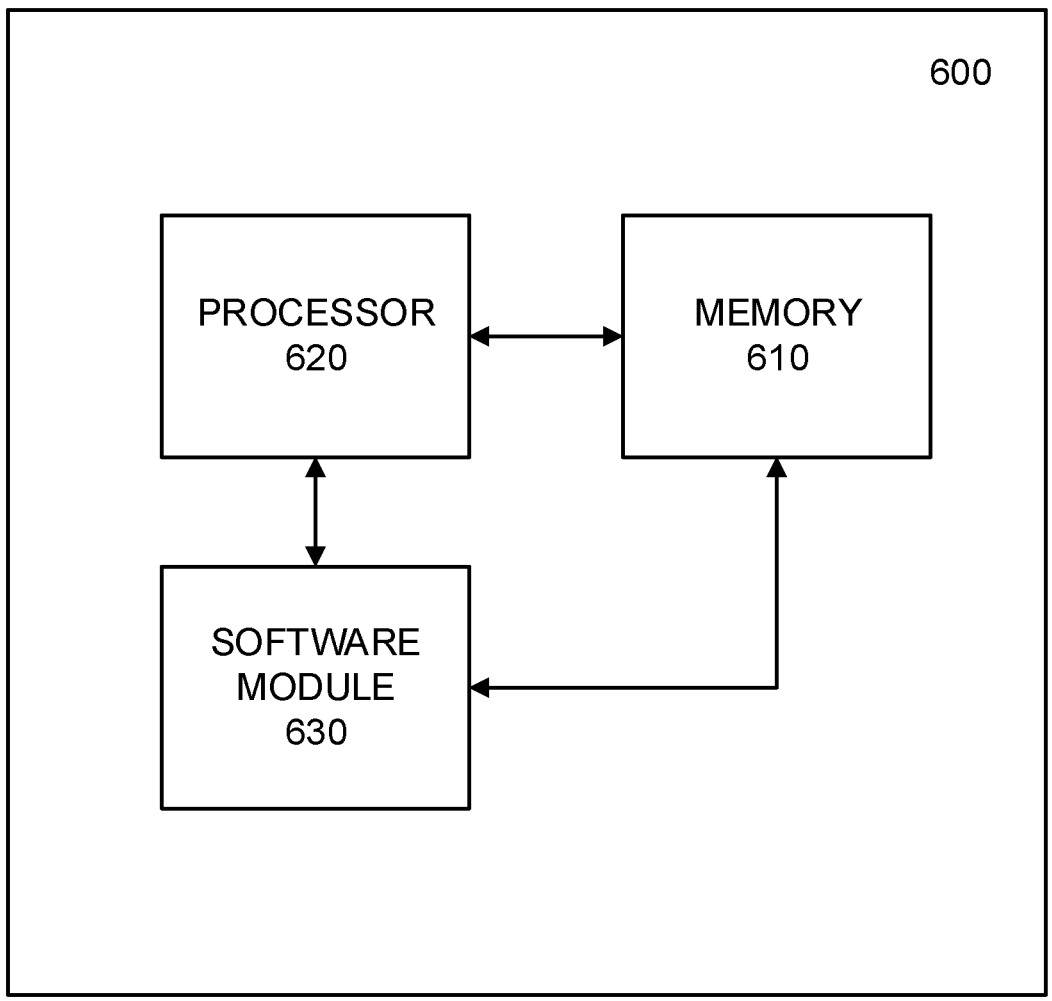
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via one or more of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying, by a control device, whether a command received by the control device will be locally processed by the control device;
   determining, by the control device, that an audio stream is associated with the command;
   in response to identifying that the command will not be locally processed, forwarding, by the control device, the audio stream to a server to generate a processed audio stream; and
   forwarding, by the server, the processed audio stream to a termination device.

2. The method of claim 1, comprising:
   receiving a notification that the audio stream was processed by the server and forwarded to a termination device.

3. The method of claim 1, comprising:
   filtering the audio stream; and
   transmitting the filtered audio stream to a loudspeaker identified by the control device.

4. The method of claim 1, comprising:
   forwarding a control device configuration to the server;
   storing the control device configuration in memory.

5. The method of claim 1, comprising:
   determining an additional command received will be processed by the control device based on a type of the command.

6. The method of claim 5, wherein a type of the additional command is one or more of:
   an additional command to modify a volume, an additional command to control an on or off status, and an additional command to terminate device selection.

7. The method of claim 6, wherein the type of the command is a digital filtering procedure to perform to the audio stream.

8. A system, comprising
   a control device configured to:

identify whether a command received by the control device will be locally processed by the control device, determine that an audio stream is associated with the command, and in response to an identification that the command will not be locally processed, forward the audio stream to a server, wherein the server is configured to:

generate a processed audio stream and to forward the processed audio stream, and forward the processed audio stream to a termination device.

9. The system of claim 8, wherein the control device is further configured to:

receive a notification that the audio stream was processed by the server and forwarded to a termination device.

10. The system of claim 8, wherein the control device is further configured to:

filter the audio stream; and transmit the filtered audio stream to a loudspeaker identified by the control device.

11. The system of claim 8, wherein the control device is further configured to:

forward a control device configuration to the server;

store the control device configuration in memory.

12. The system of claim 8, wherein the control device is further configured to:

determine an additional command received will be processed by the control device based on a type of the command.

13. The system of claim 12, wherein a type of the additional command is one or more of:

an additional command to modify a volume, an additional command to control an on or off status, and an additional command to terminate device selection.

14. The system of claim 13, wherein the type of the command is a digital filtering procedure to perform to the audio stream.

15. A non-transitory computer readable storage medium storing one or more instructions that when executed by one or more processors cause the one or more processors to perform:

identifying, by a control device, whether a command received by the control device will be locally processed by the control device;

determining, by the control device, that an audio stream is associated with the command;

in response to identifying that the command will not be locally processed, forwarding, by the control device, the audio stream to a server to generate a processed audio stream; and forwarding, by the server, the processed audio stream to a termination device.

16. The non-transitory computer readable storage medium of claim 15, wherein the one or more processors are further configured to perform:

receiving a notification that the audio stream was processed by the server and forwarded to a termination device.

17. The non-transitory computer readable storage medium of claim 15, wherein the one or more processors are further configured to perform:

filtering the audio stream; and transmitting the filtered audio stream to a loudspeaker identified by the control device.

18. The non-transitory computer readable storage medium of claim 15, wherein the one or more processors are further configured to perform:

forwarding a control device configuration to the server; and storing the control device configuration in memory.

19. The non-transitory computer readable storage medium of claim 15, wherein the one or more processors are further configured to perform:

determining an additional command received will be processed by the control device based on a type of the command.

20. The non-transitory computer readable storage medium of claim 19, wherein a type of the additional command is one or more of:

an additional command to modify a volume, an additional command to control an on or off status, and an additional command to terminate device selection.

* * * * *